(12) United States Patent
Mergl et al.

(10) Patent No.: US 12,420,690 B2
(45) Date of Patent: Sep. 23, 2025

(54) CONSOLE FOR A MOTOR VEHICLE

(71) Applicant: Brose Fahrzeugteile GmbH & Co. Kommanditgesellschaft, Coburg, Coburg (DE)

(72) Inventors: Christian Mergl, Zeil/Main (DE); Uwe Sommer, Effelder (DE); Luca Joseph, Coburg (DE); Sebastian Giese, Coburg (DE); Marcel Schieber, Weidhausen bei Coburg (DE); Wojciech Falinski, Coburg (DE)

(73) Assignee: Brose Fahrzeugteile GmbH & Co. Kommanditgesellschaft, Coburg (DE)

( * ) Notice: Subject to any disclaimer, the term of this patent is extended or adjusted under 35 U.S.C. 154(b) by 838 days.

(21) Appl. No.: 17/342,164

(22) PCT Filed: Dec. 9, 2019

(86) PCT No.: PCT/EP2019/084136
§ 371 (c)(1),
(2) Date: Feb. 3, 2022

(87) PCT Pub. No.: WO2020/120356
PCT Pub. Date: Jun. 18, 2020

(65) Prior Publication Data
US 2022/0169161 A1    Jun. 2, 2022

(30) Foreign Application Priority Data
Dec. 10, 2018    (DE) .................... 10 2018 221 340.2

(51) Int. Cl.
*B60N 2/75*    (2018.01)
*B60N 2/02*    (2006.01)
(Continued)

(52) U.S. Cl.
CPC ............. *B60N 2/77* (2018.02); *B60N 2/0248* (2013.01); *B60N 2/164* (2013.01); *B60N 2/767* (2018.02);
(Continued)

(58) Field of Classification Search
CPC .......... B60N 2/77; B60N 2/773; B60N 2/767; B60R 2011/0007
See application file for complete search history.

(56) References Cited

U.S. PATENT DOCUMENTS

2006/0163933 A1* 7/2006 Radu ...................... B60N 2/767
                                                            297/411.35
2007/0241600 A1  10/2007 Laux
(Continued)

FOREIGN PATENT DOCUMENTS

DE       4002243 A1 *  8/1991 ............... B60N 2/78
DE      19611892 C1    9/1997
(Continued)

OTHER PUBLICATIONS

International Search Report for PCT/EP2019/084136, mailed Jul. 6, 2020, 3 pages.

*Primary Examiner* — Daniel J Colilla
(74) *Attorney, Agent, or Firm* — Dickinson Wright PLLC (57) ABSTRACT

A console for a motor vehicle, having a base part to be arranged on a vehicle floor, a structural part arranged on the side of the base part that faces away from the vehicle floor, and an adjustment mechanism by means of which the structural part is adjustably connected to the base part such that the distance of the structural part from the vehicle floor can be adjusted. A spindle drive is provided for actuating the adjustment mechanism. A second aspect relates to a motor vehicle assembly having a seat adjustment unit by means of which a height of at least one vehicle seat relative to a (Continued)

vehicle floor can be adjusted. The seat adjustment unit is coupled with an adjustment mechanism of the console.

7 Claims, 8 Drawing Sheets

(51) Int. Cl.
  *B60N 2/16* (2006.01)
  *B60R 7/04* (2006.01)
  *B60R 11/00* (2006.01)

(52) U.S. Cl.
  CPC ....... *B60R 7/043* (2013.01); *B60R 2011/0007* (2013.01)

(56) References Cited

U.S. PATENT DOCUMENTS

| | | | | |
|---|---|---|---|---|
| 2011/0127819 | A1* | 6/2011 | Wada | B60N 2/50 297/344.1 |
| 2017/0327014 | A1* | 11/2017 | Cavalieri | B60N 2/78 |
| 2018/0251085 | A1* | 9/2018 | Coburn | B60R 16/037 |
| 2019/0047454 | A1* | 2/2019 | Han | B60N 2/793 |

FOREIGN PATENT DOCUMENTS

| | | | | |
|---|---|---|---|---|
| DE | 10038204 | A1 | | 4/2001 |
| DE | 10110330 | A1 * | 10/2002 | ........... B60N 2/4633 |
| DE | 102006001814 | A1 * | 7/2007 | ........... B60N 2/0224 |
| DE | 102006021184 | A1 | | 11/2007 |
| DE | 102006052087 | A1 | | 5/2008 |
| DE | 102007024000 | A1 | | 11/2008 |
| DE | 202016106055 | U1 | | 11/2016 |
| DE | 102015110347 | A1 | | 12/2016 |
| DE | 102016006230 | A1 | | 11/2017 |
| DE | 102016103017 | A1 | | 8/2018 |
| EP | 10110330 | A1 | | 10/2002 |
| EP | 2369066 | A2 | | 9/2011 |
| GB | 2473097 | A * | 3/2011 | ............... B60R 7/04 |
| JP | H0296331 | U | | 8/1990 |
| KR | 980007594 | U | | 4/1998 |
| KR | 980008834 | A | | 4/1998 |
| KR | 19980046257 | U | | 9/1998 |
| KR | 100189258 | B1 | | 6/1999 |
| KR | 20040023408 | A * | 3/2004 | ........... B60R 16/037 |
| KR | 20080004087 | U | | 9/2008 |

* cited by examiner

CONSOLE FOR A MOTOR VEHICLE

CROSS-REFERENCE TO RELATED APPLICATIONS

This application is the U.S. National Phase of PCT Application No. PCT/EP2019/084136 filed on Dec. 9, 2019, which claims priority to German Patent Application No. 10 2018 221 340.2, filed on Dec. 10, 2018, the disclosures of which are hereby incorporated in their entirety by reference herein.

TECHNICAL FIELD

The present disclosure relates to a console for use in a motor vehicle.

BACKGROUND

Vehicles may include a console capable of being arranged between two vehicle seats in a motor vehicle. For example, the console may be capable of being arranged between the driver's seat and a front passenger's seat. The console may therefore be configured, in particular, as a center component. The console may include a base part for arranging on a vehicle floor. Furthermore, the console may include an upper assembly part which is arranged on the base part. The upper assembly part is arranged on that side of the base part which faces away from the vehicle floor. In addition, an adjusting mechanism is provided on the console, by way of which adjusting mechanism the upper assembly part is connected adjustably to the base part, with the result that the spacing of the upper assembly part from the vehicle floor may be adjusted.

SUMMARY

Proceeding from a previously known apparatus of this type, the proposed solution is based on the problem of improving a console, in particular, with regard to its adjusting mechanism.

One or more of the above-mentioned problems may be addressed by the present disclosure.

Here, in accordance with a first aspect of the proposed solution, a proposed console provides that a spindle drive is provided for the actuation of the adjusting mechanism. Here, an actuation of the adjusting mechanism may comprise that the spacing of the upper assembly part from the vehicle floor is adjusted. By way of the adjustment of the spacing of the upper assembly part from the vehicle floor, a height of the upper assembly part relative to a vehicle occupant may be adjusted. The upper assembly part may therefore be height-adjustable in relation to a vehicle occupant seated as intended on a vehicle seat next to the console. The base part may be screwed or clamped, for example, to the vehicle floor. The base part may likewise be held on a guide on the vehicle floor, on which guide the base part may be displaced along the vehicle floor. Therefore, the adjustment of the spacing of the upper assembly part from the vehicle floor may include an adjustment of the spacing of the upper assembly part from the base part.

In one embodiment, therefore, the spacing between the upper assembly part and the vehicle floor may be varied via the adjusting mechanism. As a consequence, the spindle drive may actuate the adjusting mechanism, with the result that the spacing is varied. In this way, the actuation of the spindle drive may cause lifting or lowering of the upper assembly part.

To this end, the spindle drive may be arranged on the upper assembly part. In the case of the actuation of the adjusting mechanism by way of the spindle drive, the distance of the spindle drive from the vehicle floor may change. In one alternative exemplary embodiment, the spindle drive is arranged on the base part. In the case of the actuation of the adjusting mechanism by way of the spindle drive, the distance of the upper assembly part from the spindle drive may change. At the same time, the spacing of the upper assembly part from the vehicle floor may then also change.

In one exemplary embodiment, the upper assembly part may include at least one armrest for supporting an arm of a vehicle occupant. The vehicle occupant may set a desired height of the at least one armrest to his/her requirements by way of adjustment of the spacing of the base part from the upper assembly part. Furthermore, the upper assembly part may include at least one operating element for operation by way of the vehicle occupant. By way of adjustment of the spacing, the vehicle occupant can move the at least one operating element into a distance which corresponds to his/her requirements. In addition, the upper assembly part may include at least one storage compartment for depositing objects. The at least one storage department can also be arranged, by way of adjustment of the spacing, at a distance which can be reached comfortably by the vehicle occupant for depositing objects. Therefore, a motor vehicle interior compartment can in principle be capable of being adapted to the requirements of the vehicle occupant, in particular in relation to an individual design of handling ranges, via the adjustment of the upper assembly part.

In one exemplary embodiment, the upper assembly part can be adjusted relative to the base part along two orthogonal axes. In one refinement, the two orthogonal axes are formed by way of an x-axis and a z-axis. The x-axis can extend parallel to the base part. In a state of the console, in which it is installed as intended, the x-axis can be arranged, for example, along the vehicle longitudinal axis. The x-axis can intersect either the base part or the upper assembly part, but not the base part and the upper assembly part. The z-axis can be arranged perpendicularly with respect to the base part. In the state of the console, in which it is installed as intended, the z-axis can be arranged, for example, along the vehicle vertical axis. The z-axis can intersect the base part and the upper assembly part.

In one exemplary embodiment, the upper assembly part can be adjusted along the x-axis. As a result, in that state of the console, in which it is installed as intended, the position of the upper assembly part relative to a vehicle occupant can be capable of being adjusted along the vehicle longitudinal axis. In a further exemplary embodiment, the upper assembly part can be adjusted along the z-axis. As a result, in that state of the console, in which it is installed as intended, a height of the upper assembly part relative to a vehicle occupant can be capable of being adjusted along the vehicle longitudinal axis.

In one exemplary embodiment, the upper assembly part can be capable of being adjusted at the same time along the x-axis and the z-axis. In this way, the upper assembly part can be capable of being adjusted at the same time along the x-axis and the z-axis. The adjusting movement of the upper assembly part can therefore be a combined movement along the x-axis and the z-axis. For this purpose, the x-axis and the z-axis can define an adjusting plane, along which the upper assembly part can be adjusted. The spacing can be defined, in particular, as a vector of a two-dimensional vector space which can be given by way of the adjusting plane. The vector may include a pair of numbers, it being possible, in particular, for the numbers not to equal zero. In particular, the adjusting movement of the upper assembly part can therefore be a parallel displacement along the adjusting plane. The adjusting movement of the upper assembly part along the adjusting plane defines an adjusting path. The upper assembly part can therefore be capable of being adjusted in the adjusting plane along the adjusting path relative to the vehicle floor. As a result, the spacing of the upper assembly part from the vehicle floor can be adjusted.

The adjusting path can extend in any desired manner along the adjusting plane. In particular, the adjusting path can extend along a straight line, along an arcuate line and/or along a zigzag line. In one exemplary embodiment, the adjusting path extends along a circular segment.

In order to explain the adjusting movement, the adjusting mechanism will be described in greater detail in the following text. The adjusting mechanism may include at least two connecting members. The at least two connecting members can connect the base part to the upper assembly part. To this end, the at least two connecting members can be arranged in each case with a first end on the base part and with a second end on the upper assembly part. In particular, the at least two connecting members can be articulated rotatably at the points, at which they are arranged on the base part and the upper assembly part. In this way, the at least two connecting members can configure rotational axes which are connected to one another in each case rigidly, it being possible in each case for a first rotational axis to be arranged on the base part and a second rotational axis to be arranged on the upper assembly part. Therefore, pivoting of the at least two connecting members relative to the base part can lead to an adjusting force being introduced into the upper assembly part, with the result that the spacing of the upper assembly part from the vehicle floor is adjusted.

The adjusting path can be predefined by way of a length of the at least two connecting members in such a way that the upper assembly part is adjusted along a circular segment with a radius which corresponds to the length of the at least two connecting members. It goes without saying that the length of the at least two connecting members can be different. The points, at which the at least two connecting members are arranged to the upper assembly part, are then moved along associated adjusting paths. The associated adjusting paths can be formed by way of circular segments, the radii of which are different. The upper assembly part can then be adjusted along an adjusting path which is configured as a combination of the associated adjusting paths. For example, an inclination of the upper assembly part can be capable of being controlled by way of different lengths of the at least two connecting members. It goes without saying that the lengths of the at least two connecting members can be adjustable. As a result, the spacing can be capable of being adjusted by way of the adjustment of the length of the at least two connecting members. In addition, the inclination of the upper assembly part can also be capable of being adjusted via the adjustment of the length.

The points, at which the at least two connecting members are arranged on the upper assembly part, are in each case at identical distances from the vehicle floor in one exemplary embodiment. In an alternative exemplary embodiment, the points are in each case at different distances from the vehicle floor. In this exemplary embodiment, in particular, the lengths of the at least two connecting members can be different. The at least two connecting members can be arranged at an angle or obliquely with respect to one another. The angle between the at least two connecting members can be dependent on the points and, in particular, on the arrangement of the rotational axes on the base part and the upper assembly part.

The at least two connecting members can likewise extend parallel to one another. In one exemplary embodiment, the at least two connecting members are configured as a parallel fitting. Here, the rotational axes can form the edges of a parallelepiped. The points can then be arranged in each case on a side of the console at the corners of a parallelogram.

For the actuation of the adjusting mechanism, a spindle drive is provided which will be described in greater detail in the following text. The spindle drive can be arranged in the adjusting plane, and may include a spindle and a drive, by way of which the spindle can be displaced along its longitudinal axis relative to the drive. For the introduction of an adjusting force into the upper assembly part, the spindle can be connected to a first connecting member of the at least two connecting members, for example via a fastening means. By way of the displacement of the spindle, an adjusting force can be introduced into the first connecting member via the connection to the first connecting member. The adjusting force can bring it about that the first connecting member is adjusted relative to the upper assembly part. In particular, the first connecting member can be capable of being pivoted relative to the upper assembly part by way of the actuation of the spindle drive. The adjustment of the first connecting member relative to the upper assembly part can lead to a simultaneous adjustment of the first connecting member relative to the base part. If the first connecting member is held in a stationary and rotatable manner on the base part, the adjustment of the first connecting member can be capable of being converted into an adjustment of the upper assembly part.

The adjustment of the first connecting member relative to the upper assembly part can lead to a change of an angle of attack which is defined between the spindle and the first connecting member. The angle of attack of the spindle on the first connecting member can therefore be capable of being adjusted. Therefore, in one exemplary embodiment, the spindle is articulated on the first connecting member such that it can be rotated along the adjusting plane, with the result that the adjustment of the first connecting member relative to the spindle can be compensated for via a change of the angle of attack. In principle, the angle of attack can of course also be constant, and the adjustment of the first connecting member relative to the spindle can be capable of being compensated for via a change of the position of the spindle drive. To this end, for example, the spindle drive can be arranged such that it can be displaced along the upper assembly part, with the result that an adjustment of the first connecting member brings about a displacement of the spindle drive.

In one alternative embodiment, the spindle acts on the second connecting member which is substantially identical to the first connecting member. In principle, the spindle can act on any desired one of the at least two connecting members. In one exemplary embodiment, the spindle drive is arranged between the at least two connecting members. The spindle can then act on the rear (along the vehicle longitudinal axis) connecting member which faces away from the front of the motor vehicle. It is also conceivable and possible for at least two spindle drives to be provided for the at least two connecting members.

In one exemplary embodiment, the at least two connecting members define an elevation angle on the base part or relative to the vehicle floor. The elevation angle can represent a spacing of the upper assembly part from the vehicle floor. In particular, the spacing can be a function of the elevation angle. In one exemplary embodiment, in which the at least two connecting members are configured as a parallel fitting, the elevation angle in each case for the at least two connecting members is identical. The spacing can then result from the product of the sine of the elevation angle and the length of the at least two connecting members.

Furthermore, the addressed problem is also solved by way of a motor vehicle assembly for arranging in a motor vehicle. A motor vehicle assembly of this type may include at least one vehicle seat. In principle, the motor vehicle assembly can likewise comprise at least two vehicle seats which, in the state, in which they are mounted as intended, are arranged next to one another within a vehicle. Here, for example, the at least two vehicle seats can be a driver's seat and a front passenger's seat. Furthermore, the motor vehicle assembly may include a seat adjusting means, by way of which a height of the at least one vehicle seat relative to a vehicle floor can be adjusted. In principle, an inclination of the at least one vehicle seat and/or a position of the at least one vehicle seat along the vehicle longitudinal axis can of course also be capable of being adjusted by way of the seat adjusting means.

In addition, the motor vehicle assembly may include a console, in particular in accordance with a first aspect of the proposed solution, which console is arranged on the at least one vehicle seat. In principle, the console can be arranged between the at least two vehicle seats. The at least two vehicle seats can be spaced apart from one another, with the result that the console can be capable of being arranged in an intermediate space between the at least two vehicle seats. The console can be configured, in particular, as a center console.

In accordance with the second aspect of the proposed solution, the seat adjusting means is coupled to an adjusting mechanism of the console, with the result that an adjustment of the height of the at least one vehicle seat brings about an adjustment of the console. The adjusting mechanism of the console can adjust, for example, a height of the console above the vehicle floor. In particular, the seat adjusting means can be coupled to the adjusting mechanism in a mechatronic manner. On account of the coupling between the seat adjusting means and the adjusting mechanism, the console can be capable of being adjusted in an analogous manner with respect to adjustment of the at least one vehicle seat. In one embodiment, a vehicle occupant who is seated as intended on the at least one vehicle seat can actuate the seat adjusting means, with the result that the height of the vehicle seat is adjusted and, at the same time, the adjusting mechanism of the console produces an adjustment of the spacing of the upper assembly part from the vehicle floor.

In one additional variant, the motor vehicle assembly may include a position memory means which can provide, in particular, a memory function. In the position memory means, values of a height of the at least one vehicle seat can be capable of being stored. For example, different vehicle occupants can store values assigned to them of a height in the position memory means. The values of a height can be capable of being retrieved from the position memory means, with the result that, in the case of a change of the vehicle occupant, the different vehicle occupants can retrieve the stored associated value of the height of the vehicle seat and can therefore set the vehicle seat to said height.

Values of a spacing between the base part and the upper assembly part of the console can likewise be capable of being stored in the position memory means. For example, the values of a spacing can be stored as associated values if different vehicle occupants store values assigned to them of a height in the position memory means. The values of a spacing can be capable of being retrieved from the position memory means. Then, for example in the case of a change of the vehicle occupant, the different vehicle occupants can also retrieve the stored associated value of the spacing when they retrieve the stored associated value of the height of the at least one vehicle seat. In this way, the spacing can be capable of being adjusted to the associated value of the spacing, and the height of the at least one vehicle seat can be capable of being adjusted to the associated value of the height. In particular, the adjustment of the height of the at least one vehicle seat and the spacing can take place at the same time. It goes without saying that every other adjustment of the seat, such as an adjustment of the inclination or the position along the vehicle longitudinal axis, can likewise be coupled to an adjustment of the spacing.

BRIEF DESCRIPTION OF THE DRAWINGS

Exemplary embodiments with respect to the proposed solution are shown by way of example in the appended figures, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
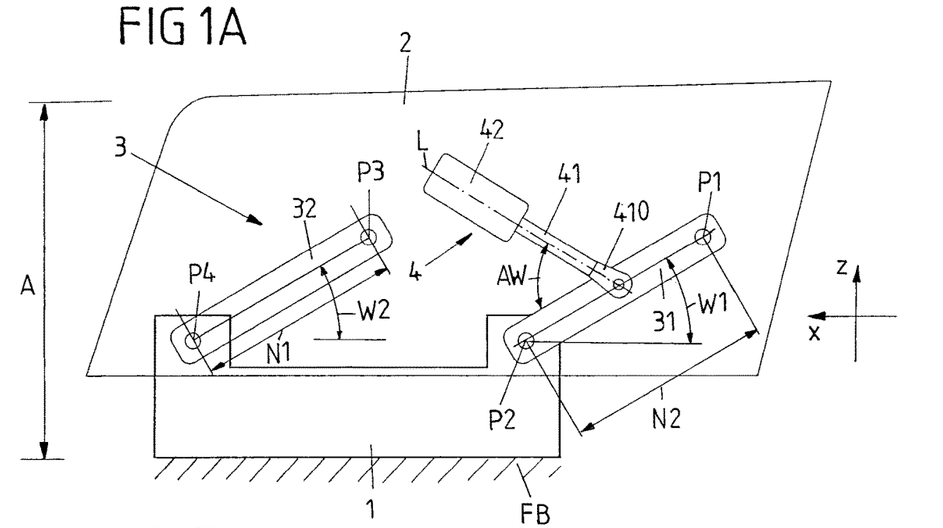
FIG. 1A shows a diagrammatic side view of a console.
Figure 1B:
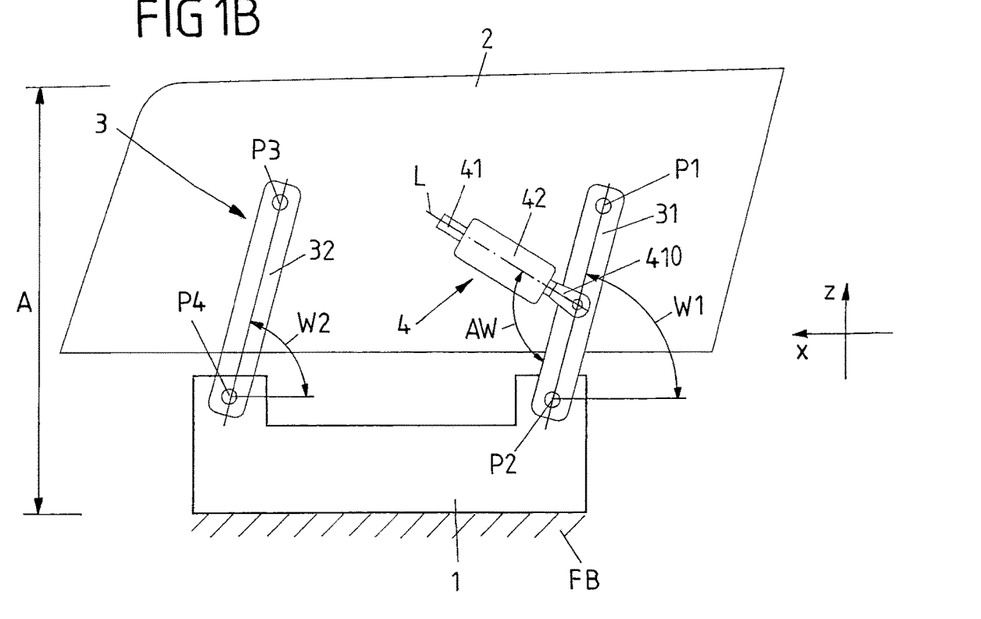
FIG. 1B shows a diagrammatic side view of a console.

FIG. 1A and FIG. 1B diagrammatically show a side view of a console with a base part 1 which is arranged on a vehicle floor FB, and with an upper assembly part 2 which is arranged on the base part 1. Here, the upper assembly part 2 is arranged on that side of the base part 1 which faces away from the vehicle floor FB. The base part 1 is therefore arranged between the upper assembly part 2 and the vehicle floor FB. Therefore, the upper assembly part 2 is arranged on the vehicle floor FB via the base part 1. In principle, the console can be arranged in any desired manner in an interior compartment of a motor vehicle. In particular, the console can be capable of being used for flexible design of the interior compartment.

The upper assembly part 2 is connected to the base part 1 such that it can be adjusted via an adjusting mechanism 3. Via the adjusting mechanism 3, the upper assembly part 2 can be adjusted relative to the base part 1. The base part 1 is held on the vehicle floor FB in a stationary manner, and the upper assembly part 2 can be adjusted relative to the vehicle floor FB via the adjusting mechanism 3. Here, the upper assembly part 2 can be adjusted in such a way that the spacing A of the upper assembly part 2 from the vehicle floor FB can be adjusted via the adjusting mechanism 3. In principle, the spacing A can be adjusted in an infinitely variable manner. FIG. 1A shows one exemplary embodiment of the console, in which the spacing A of the upper assembly part 2 from the base part 1 is smaller than in the exemplary embodiment which is shown in FIGS. 1B and 1n which the spacing A is relatively great. The spacing A between the upper assembly part 2 and the vehicle floor FB can therefore be varied via the adjusting mechanism 3 at least between the two positions of the upper assembly part 2 which are shown in FIG. 1A and FIG. 1B. In principle, in one alternative exemplary embodiment, the upper assembly part 2 can be arranged on the vehicle floor FB via the adjusting mechanism.

For the actuation of the adjusting mechanism 3, a spindle drive 4 is provided which is arranged on the upper assembly part 2. In principle, the spindle drive 4 can likewise be arranged on the base part 1 or on the vehicle floor FB. The spindle drive 4 may include a spindle 41 which acts on the adjusting mechanism 3. For the actuation of the adjusting mechanism 3, the spindle 41 can be adjusted relative to the upper assembly part 2. In an alternative exemplary embodiment, in which the spindle drive 4 is arranged on the base part 1 or the vehicle floor FB, the spindle 41 can accordingly be adjusted relative to the base part 1 or the vehicle floor FB.

Furthermore, the spindle drive 4 may include a drive 42 for driving the spindle 41. Via the drive 42, the spindle 41 can be adjusted relative to the upper assembly part 2. The drive 42 therefore causes the adjusting movement of the spindle 41. To this end, the spindle drive 4 introduces an adjusting force from the drive 42 via the spindle 41 into the adjusting mechanism 3. Here, the adjusting movement of the adjusting mechanism 3 takes place relative to the upper assembly part 2. In principle, the adjusting movement can take place relative to the vehicle floor FB if the spindle drive 4 is arranged on the vehicle floor FB, or can take place relative to the base part 1 if the spindle drive 4 is arranged on the base part 1.

The spindle 41 may include a bracket 410, via which the spindle 41 is connected to the adjusting mechanism 3. Here, the spindle 41 is articulated pivotably on the adjusting mechanism 3. A pivoting movement of the spindle 41 during the adjustment of the spacing A takes place in an adjusting plane, along which the spacing A is adjusted. In this way, the spindle 41 can compensate for a change of an angle of attack AW on the adjusting mechanism 3. In addition, the spindle 41 can act on the adjusting mechanism 3 in the adjusting plane such that they can be rotated about a longitudinal axis L of the spindle 41. For example, the drive 42 can then rotate the spindle 41 for the adjustment relative to the drive 42 about the longitudinal axis L. Here, the longitudinal axis L extends from the drive 42 to the adjusting mechanism 3. In principle, in an alternative exemplary embodiment, the spindle 41 can be connected fixedly, in particular fixedly for conjoint rotation, to the adjusting mechanism 3. For example, the drive 42 can be capable of being adjusted relative to the upper assembly part 2 (in the case of the arrangement of the spindle drive 4 on the upper assembly part 2), in order to compensate for a change of an angle of attack AW on the adjusting mechanism 3.

Figure 3A:
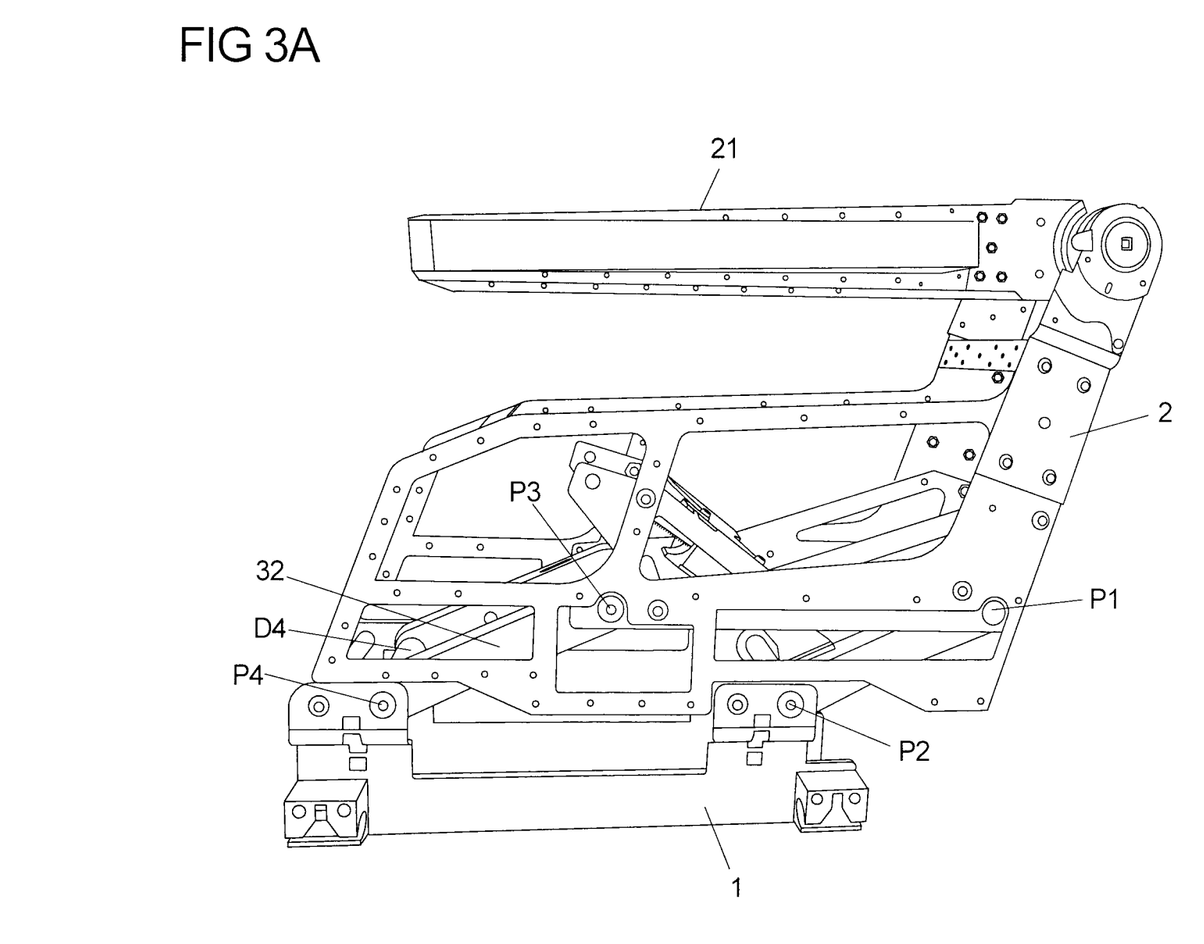
FIG. 3A shows a side view of a console.
Figure 3B:
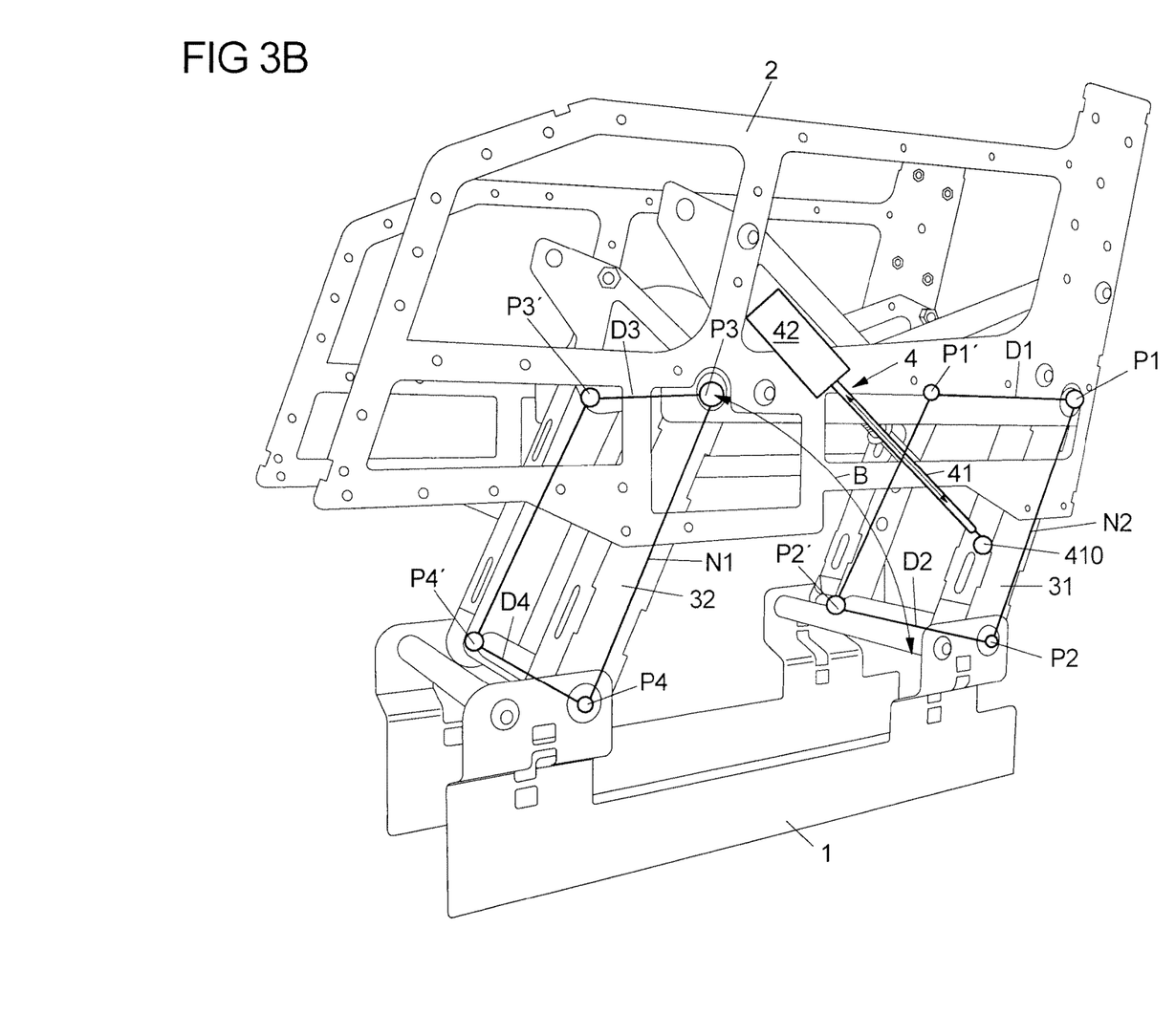
FIG. 3B shows a perspective view of a console with an adjusting path.
Figure 4A:
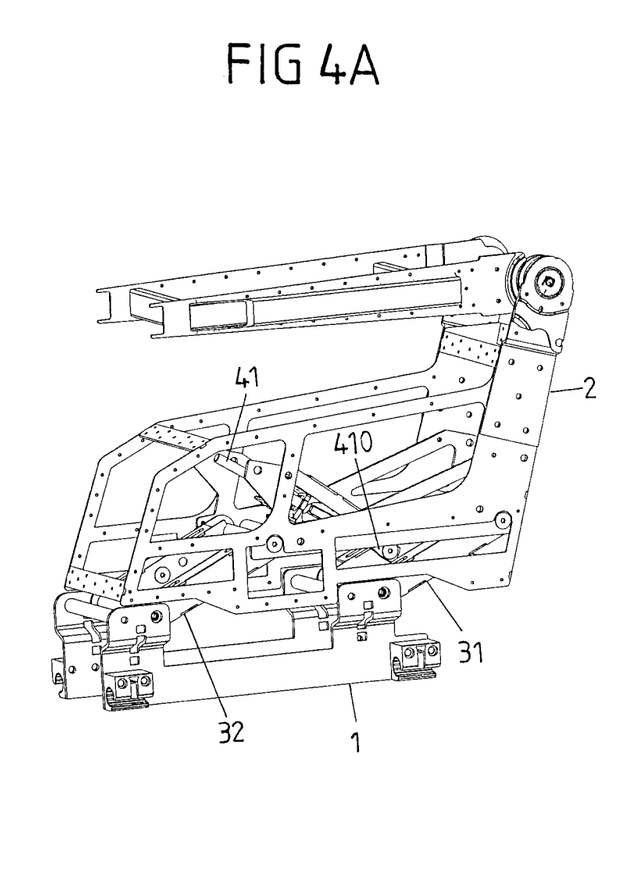
FIG. 4A shows a perspective view of a console.
Figure 4B:
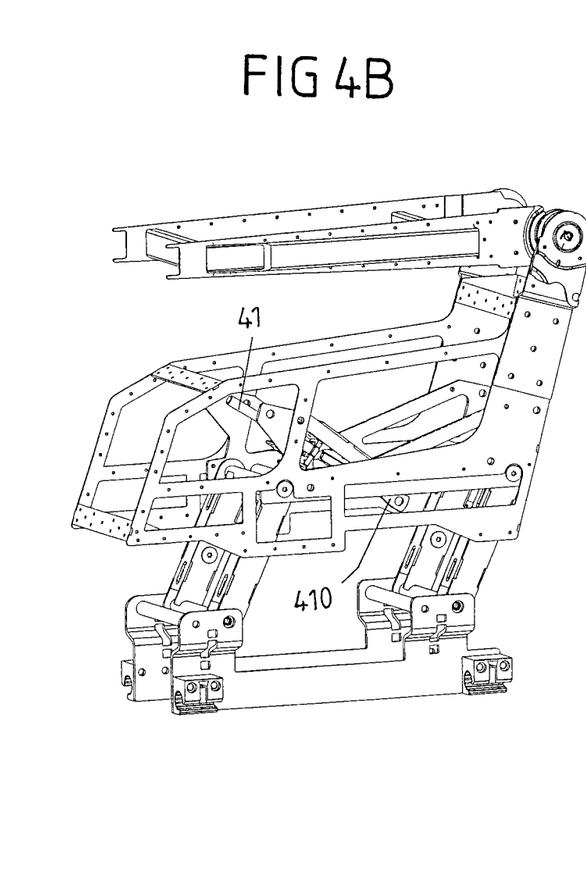
FIG. 4B shows a perspective view of a console.

The adjusting mechanism 3 may include two connecting members 31, 32 which extend between the base part 1 and the upper assembly part 2. A first end of the connecting members 31, 32 is articulated on the base part 1 in each case at a point P2, P4, and a second end of the connecting members 31, 32 is articulated on the upper assembly part 2 in each case at a point P1, P3. The connecting members 31, 32 can be articulated on the upper assembly part 2 at a multiplicity of points P1, P3, P1', P3', as shown in FIG. 3B. The connecting members 31, 32 can be pivoted in each case about rotational axes D1, D2, D3, D4 which extend through the points P1, P2, P3, P4, P1', P2', P3', P4'. The rotational axes D1, D2, D3, D4 extend perpendicularly with respect to the adjusting plane.

Figure 2A:
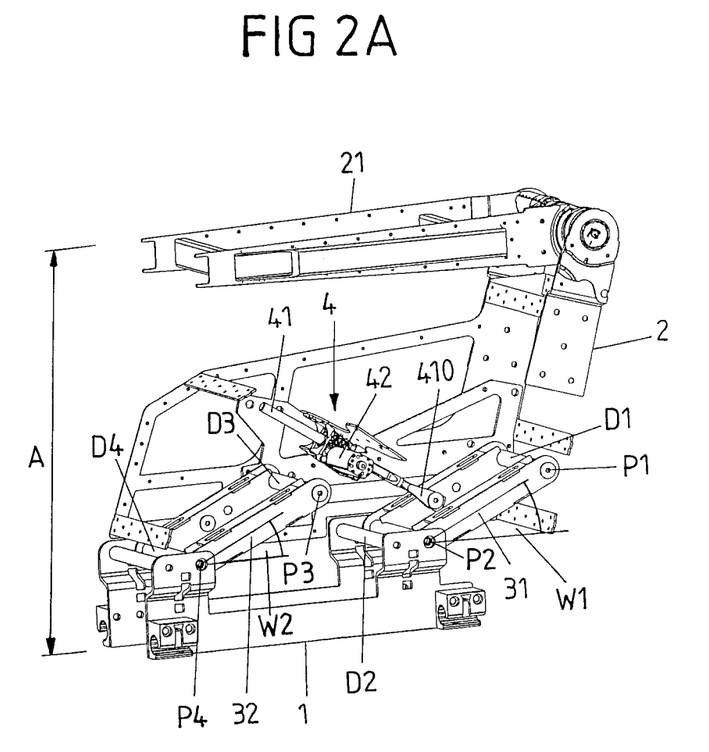
FIG. 2A shows a sectional view of a console.
Figure 2B:
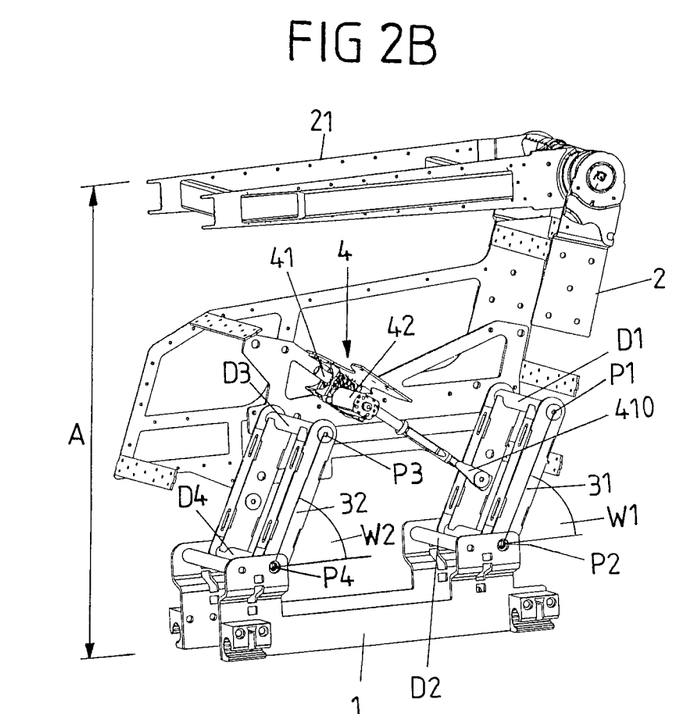
FIG. 2B shows a sectional view of a console.

The connecting members 31, 32 in accordance with the exemplary embodiments which are shown in FIG. 2A and FIG. 2B are formed by way of a parallel fitting. Here, the connecting members 31, 32 are of equal length and are arranged parallel to one another. In principle, in an alternative exemplary embodiment, the connecting members 31, 32 can be arranged obliquely, in particular obliquely in the adjusting plane, with respect to one another, and can likewise have different lengths N. For example, an adjusting path B of the upper assembly part 2 can be capable of being varied via the length N1, N2 and the orientation of the connecting members 31, 32 with respect to one another. It is of course also conceivable and possible for an adjustment of the length N1, N2 of the connecting members 31, 32 and of the orientation of the connecting members 31, 32 with respect to one another to be converted into an adjusting movement of the upper assembly part 2. In one exemplary embodiment, a connecting member 31, 32 can be capable of being lengthened, with the result that the upper assembly part 2 can be tilted relative to the vehicle floor FB.

The spindle drive 4 acts on one of the connecting members 31 for the actuation of the adjusting mechanism 3. To this end, the spindle 41 is connected to the first connecting member 31 for the introduction of an adjusting force. In this way, the spindle drive 4 produces an adjusting movement of the first connecting member 31 relative to the upper assembly part 2. The connecting members 31, 32 are articulated on the base part 1 in a rotatable but stationary manner. Therefore, the adjusting movement of the first connecting member 31 is converted into an adjusting movement of the upper assembly part 2. The spindle drive 4 produces an adjusting movement of the first connecting member 31 by way of actuation of the adjusting mechanism 3.

In principle, in an alternative exemplary embodiment, the spindle drive 4 can likewise be arranged on one of the connecting members 31, 32. The spindle 41 can then act on the upper assembly part 2, the base part 1 or the vehicle floor FB for the introduction of an adjusting force to the first connecting member 31.

Moreover, it can be gathered from FIG. 2A and FIG. 2B that the upper assembly part 2 comprises an armrest 21 for supporting an arm of a vehicle occupant. The armrest 21 is lower relative to a vehicle occupant in FIG. 2A than in FIG. 2B, the spacing A between the base part 1 and the upper assembly part 2 being smaller in FIG. 2A than in FIG. 2B. In this way, a height of the armrest 21 can be set by way of adjustment of the spacing A. A further exemplary embodiment, in which the upper assembly part 2 comprises an armrest 21, is shown in FIG. 3A.

Furthermore, it can be gathered from FIG. 2A and FIG. 2B that, in the case of a greater spacing A between the base part 1 and the upper assembly part 2, in each case an elevation angle W1, W2 between the connecting members 31, 32 and the base part or with respect to the vehicle floor FB is greater than in the case of a smaller spacing A. The smaller the spacing A, the flatter therefore the elevation angle W1, W2. In principle, the upper assembly part 2 may include more than one armrest 21, for example for a driver and a front passenger. Furthermore, an operating element for operation by way of the vehicle occupant can also be provided on the upper assembly part 2.

The upper assembly part 2 can be adjusted relative to the base part 1 along the z-axis Z which is arranged perpendicularly with respect to the vehicle floor FB. The z-axis Z intersects the base part 1 and the upper assembly part 2. An adjustment of the upper assembly part 2 along the z-axis Z brings it about, for example, that the height of the upper assembly part 2 can be adjusted to a vehicle occupant. In particular, in the case of an adjustment of the upper assembly part 2 along the z-axis Z, the height of an armrest 21 can be adapted to a vehicle occupant, with the result that the vehicle occupant can lay an arm on the armrest 21 with an upright torso.

Moreover, the upper assembly part 2 can be adjusted relative to the base part 1 along an x-axis X which, if the console is arranged as intended in a motor vehicle between two vehicle seats S, S', extends along the driving direction of the motor vehicle. The x-axis X therefore extends along a motor vehicle longitudinal axis. Moreover, the x-axis X is arranged parallel to the vehicle floor FB. The x-axis X is orthogonal with respect to the z-axis Z.

In this way, the upper assembly part 2 can be adjusted along two orthogonal axes. Accordingly, the spacing A of the upper assembly part 2 from the base part 1 can be adjusted both in parallel and perpendicularly with respect to the base part 1.

The x-axis X and the z-axis Z lie in the adjusting plane, along which the upper assembly part 2 can be adjusted. The adjusting plane intersects the vehicle floor FB perpendicularly. Furthermore, in that state of the console, in which it is arranged as intended between the vehicle seats S, S', the adjusting plane can be arranged such that the adjusting plane does not intersect the vehicle seats S, S'. In principle, the upper assembly part 2 can be adjusted along any desired adjusting path B for the adjustment of the spacing A. The adjusting path B lies in the adjusting plane. FIG. 3B shows an adjusting path B which extends along a circular segment. The upper assembly part 2 therefore moves along a constant radius. Here, the adjusting movement is a coupled movement along the x-axis X and the z-axis Z. In this way, the upper assembly part 2 can be adjusted at the same time along the x-axis X and the z-axis Z. In principle, the upper assembly part 2 can be adjusted in each case independently and/or successively either along the x-axis X or along the z-axis Z.

The radius of the adjusting path B corresponds to a length N1, N2 of the connecting members 31, 32. Here, the length N1, N2 of the connecting members 31, 32 is defined as a length on a side of the console between a first point P1, P3 or P1', P3', at which a connecting member 31, 32 is articulated on the base part 1, and a second point P2, P4 or P2', P4', on which the connecting member 31, 32 is articulated on the upper assembly part 2.

In principle, the adjusting path B can extend along a straight line, can extend in any desired curved manner, and/or can extend along a hook-shaped line. The upper assembly part 2 can be capable of being adjusted along any desired adjustment path B, for example, by way of an interaction of pivotable connecting members 31, 32, connecting members 31, 32 of different length N1, N2, and/or connecting members 31, 32 with an adjustable length N1, N2. The length N1, N2 of the connecting members 31, 32 can be capable of being adjusted, for example, by way of further spindle drives. Further spindle drives can likewise be provided for the second connecting member 31, 32 and possibly further connecting members 31, 32.

The spindle drive 4 is arranged in the adjusting plane, with the result that the spindle 41 can be rotated along the adjusting plane. The longitudinal axis L of the spindle 41 is therefore arranged in the adjusting plane.

The connecting members 31, 32 in each case define an elevation angle W1, W2 with respect to the base part 1, the spacing A varying in a manner which is dependent on said elevation angle W1, W2. In the above-described exemplary embodiments, the elevation angles W1, W2 on the two connecting members 31, 32 are always identical, since the connecting members 31, 32 are arranged parallel to one another. Consequently, the spacing A is a trigonometric function of the elevation angle W1, W2 of the connecting members 31, 32 above the base part 1. Moreover, the function is dependent on the length N1, N2 of the connecting member 31, 32, on which the elevation angle W1, W2 is measured. Therefore, the spacing A is given by way of the product of the length N1, N2 of the connecting member 31, 32, on which the elevation angle W1, W2 is measured, and the sine of the elevation angle W1, W2.

Figure 5A:
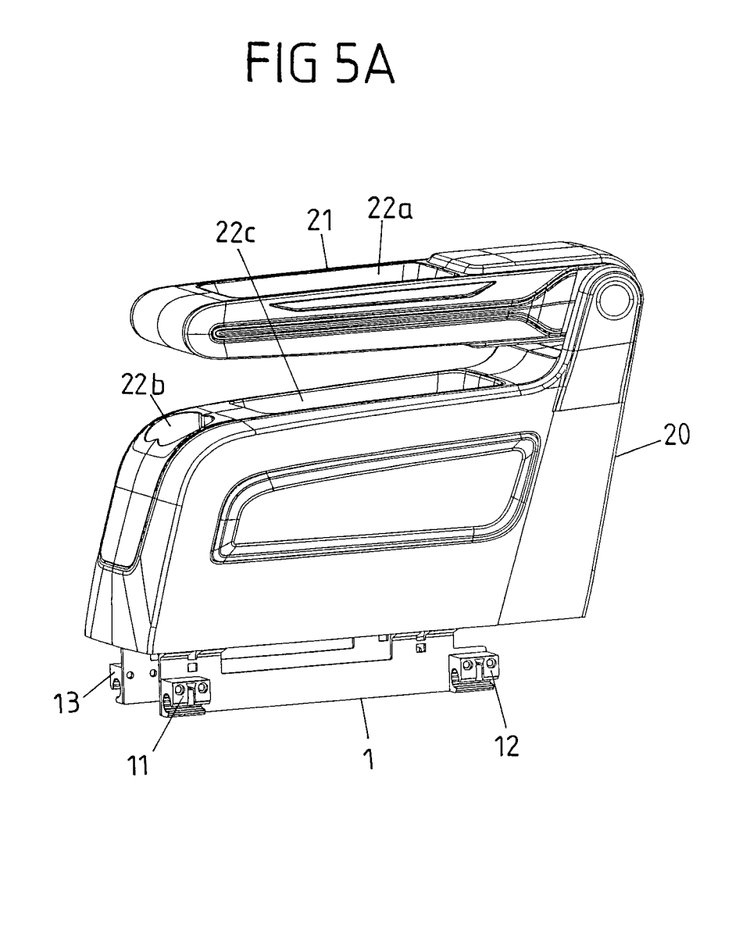
FIG. 5A shows a perspective view of a console with a trim part.
Figure 5B:
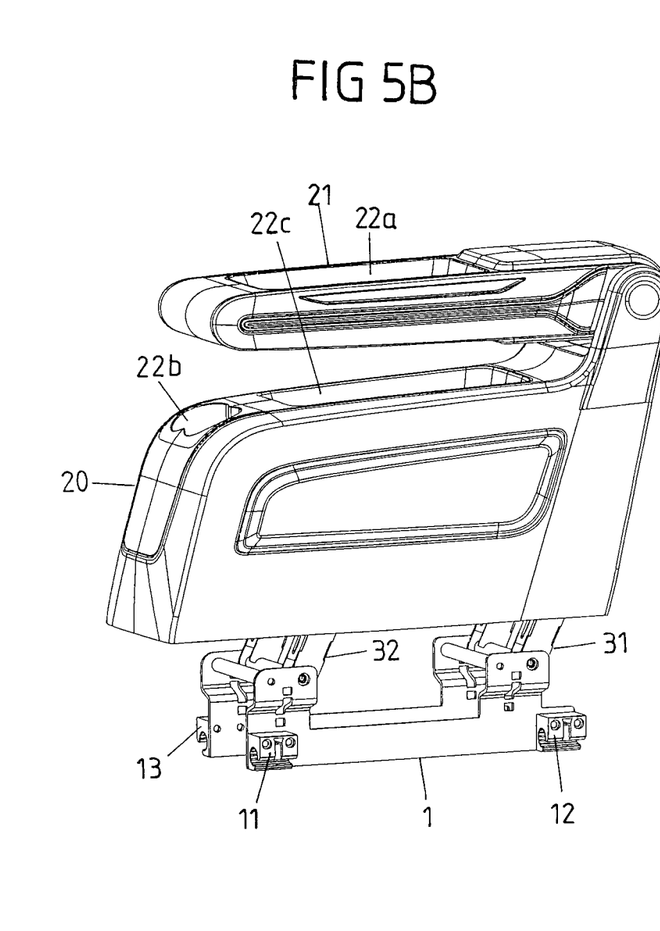
FIG. 5B shows a perspective view of a console with a trim part.

FIG. 5A shows one exemplary embodiment of a console, the upper assembly part 2 of which comprises a trim panel 20. An armrest 21 and a plurality of storage compartments 22a, 22b, 22c for storing objects are provided on the upper assembly part 2. One of the storage compartments 22a is arranged on the armrest 21. FIG. 5B shows a structurally identical console, the spacing A between the base part 1 and the upper assembly part 2 being greater than in the case of the console which is shown in FIG. 5B.

Figure 6:
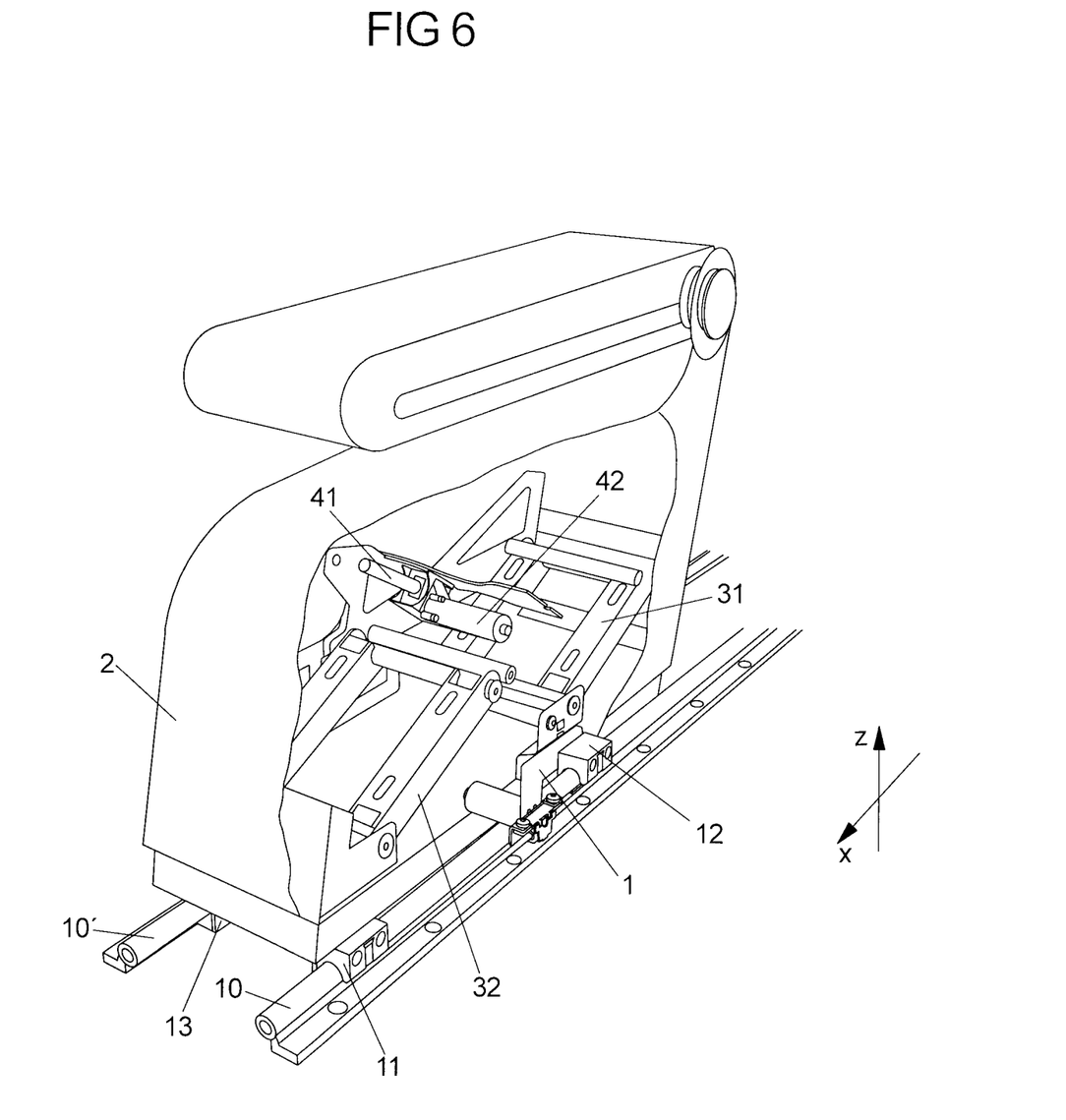
FIG. 6 shows a sectional view of a console.

FIG. 6 shows a sectional view of a console, in the case of which a part of the trim panel 20 is shown in a transparent manner. In addition, the base part 1 comprises a plurality of sliders 11, 12, 13 and a guide 10, 10', the sliders 11, 12, 13 being held on the guide 10, 10'. The sliders 11, 12, 13 are fastened releasably to the guide 10, 10', with the result that, as required, the sliders 11, 12, 13 can be displaced along the guide 10, 10'. In principle, the base part 1 can be capable of being displaced along the guide 10, 10'. The guide 10, 10' is arranged on the vehicle floor FB, and extends along the x-axis X. In that state of the console, in which it is mounted as intended, the guide 10, 10' extends along the vehicle longitudinal axis.

Figure 7:
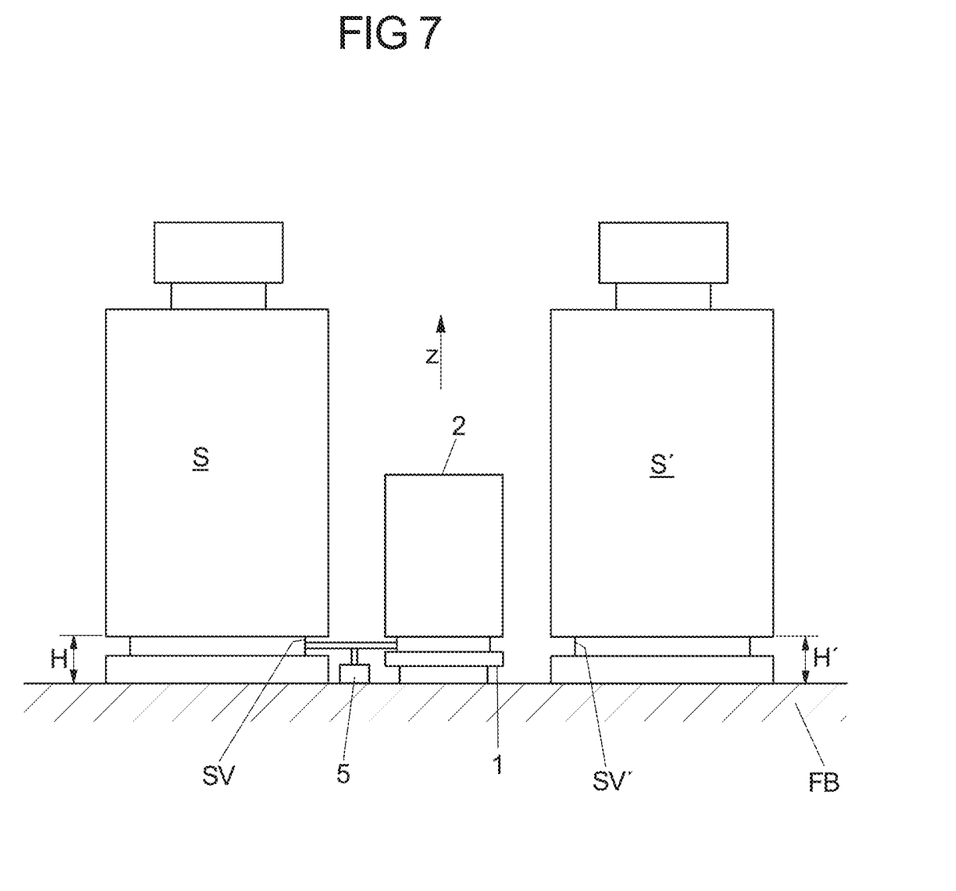
FIG. 7 shows two vehicle seats with a console.

FIG. 7 shows a motor vehicle assembly with two vehicle seats S, S'. A console is arranged between the vehicle seats S, S'. The vehicle seats S, S' in each case comprise a seat adjusting means SV, SV', by way of which a height H, H' of the vehicle seats S, S' relative to a vehicle floor FB can be adjusted. The height H, H' of the vehicle seats S, S' can be adjusted along the z-axis Z. The seat adjusting means SV of one of the vehicle seats S is coupled to the adjusting mechanism 3 of the console. In this way, an adjustment of the height H of the vehicle seat S which is coupled in this way can bring about an adjustment of the spacing A of the upper assembly part 2 from the base part 1 of the console.

A vehicle occupant can therefore adjust the height of the vehicle seat S, and an adjustment of the upper assembly part 2 is triggered at the same time. As a result, the relative positioning of the coupled vehicle seat S and upper assembly part 2 can be kept constant, for example. In principle, the height H of the vehicle seat S, an inclination and/or a position along the x-axis X can of course be coupled to the adjustment of the upper assembly part 2.

In addition, the motor vehicle assembly comprises a position memory means 5, in which values of a height H of the vehicle seat S which is coupled to the adjusting mechanism 3 and values of a spacing A between the base part 1 and the upper assembly part 2 of the console can be stored and retrieved. One or more vehicle occupants of the coupled vehicle seat S can permanently store a multiplicity of combinations of a value of the height H and a value of the spacing A in the position memory means 5, and can retrieve them again in order to set the height H and the spacing A.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF DESIGNATIONS

1 Base part
10, 10' Guide
11, 12, 13 Slider
2 Upper assembly part
20 Trim panel
21 Armrest
22a, 22b, 22c Storage compartments
3 Adjusting mechanism
31, 32 Connecting member
4 Spindle drive
41 Spindle
410 Bracket
42 Drive
5 Position memory means
A Spacing
AW Angle of attack
B Adjusting path
D1, D2, D3, D4 Rotational axis
FB Vehicle floor
L Longitudinal axis
H, H' Height of the vehicle seats
N1, N2 Length
P1, P2, P3, P4, P1', Point
P2', P3', P4', S, S' Vehicle seat
SV, SV' Seat adjusting means
W1, W2 Elevation angle
X x-axis
Z z-axis While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A motor vehicle assembly comprising:
at least one vehicle seat configured to be adjusted relative to a vehicle floor; and
a console arranged adjacent to the at least one vehicle seat and including,
a base part configured to be disposed on the vehicle floor,
an upper assembly part disposed on a side of the base part, the side facing away from the vehicle floor,
a position memory means configured to store and retrieve height values indicative of a height of the at least one vehicle seat, and
an adjusting mechanism configured to adjust a space between the base part and the upper assembly part, wherein the at least one vehicle seat is coupled to the adjusting mechanism so that adjusting athe height of the at least one vehicle seat triggers an adjustment of the space between the base part and the upper assembly part at the same time, wherein the at least one vehicle seat is electrically coupled to the adjusting mechanism of the console.

2. The motor vehicle assembly of claim 1, wherein the position memory means is further configured to store and retrieve space values indicative of size of a space between the base part and the upper assembly part, to enable a user of the at least one vehicle seat to permanently store a multiplicity of combinations of the height values and the space values, and retrieve the multiplicity of combinations of the height values and the space values again in order to set the height and the size of the space.

3. The motor vehicle assembly of claim 1, wherein the console includes an armrest configured to support an arm of an occupant seated in the at least one vehicle seat and the adjusting mechanism of the console is configured to adjust a height of the armrest with respect to the vehicle floor.

4. The motor vehicle assembly of claim 3, wherein the adjusting mechanism is configured to adjust the fore-aft position of the upper assembly part of the console with respect to a longitudinal direction of the motor vehicle and as fore-aft position of the at least one vehicle seat is adjusted, the fore-aft position of the upper assembly part is adjusted.

5. The motor vehicle assembly of claim 4, wherein the adjusting mechanism is configured to adjust an inclination of the console with respect to the vehicle floor, and wherein as an inclination of the at least one vehicle seat is adjusted, the inclination of the console is adjusted.

6. The motor vehicle assembly of claim 1, wherein the console includes a guide member and a slide, wherein the guide member has substantially cylindrical shape, extends along a longitudinal direction, and is coupled to the vehicle floor, wherein the slide is configured to move along the guide member as a fore-aft position of the console is adjusted.

7. The motor vehicle assembly of claim 1, wherein the adjusting mechanism includes at least one spindle drive.

* * * * *